(12) United States Patent
Shen (10) Patent No.: US 7,350,034 B2
(45) Date of Patent: Mar. 25, 2008

(54) ARCHITECTURE SUPPORT OF BEST-EFFORT ATOMIC TRANSACTIONS FOR MULTIPROCESSOR SYSTEMS

(75) Inventor: Xiaowei Shen, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 362 days.

(21) Appl. No.: 11/156,913

(22) Filed: Jun. 20, 2005

(65) Prior Publication Data

US 2006/0288173 A1 Dec. 21, 2006

(51) Int. Cl.
*G06F 12/14* (2006.01)
(52) U.S. Cl. ...................................... 711/145
(58) Field of Classification Search ............. 711/144, 711/141, 145, 146
See application file for complete search history.

(56) References Cited

U.S. PATENT DOCUMENTS

| | | | |
|---|---|---|---|
| 5,197,148 A | | 3/1993 | Blount et al. |
| 5,414,840 A | | 5/1995 | Rengarajan et al. |
| 5,548,780 A | | 8/1996 | Krein |
| 5,581,782 A | | 12/1996 | Sarangdhar et al. |
| 5,613,153 A | * | 3/1997 | Arimilli et al. .............. 710/1 |
| 5,761,731 A | | 6/1998 | Van Doren et al. |
| 5,918,055 A | | 6/1999 | Crawford et al. |
| 5,987,552 A | | 11/1999 | Chittor et al. |
| 6,012,094 A | | 1/2000 | Laymann et al. |
| 6,112,016 A | | 8/2000 | MacWilliams et al. |
| 6,438,651 B1 | * | 8/2002 | Slane ........................ 711/118 |
| 6,490,642 B1 | | 12/2002 | Thekkath et al. |
| 6,928,525 B1 | * | 8/2005 | Ebner et al. ................. 711/150 |
| 2004/0117573 A1 | * | 6/2004 | Sutanto et al. .............. 711/163 |

OTHER PUBLICATIONS

Olin Shivers, et al., "Atomic Heap Transactions and Fine-Grain Interrupts," *ACM 1999 Internat Conference on Functional Programming (ICFP)*, Sep. 1999, Paris, France, pp. 1-13.
IBM Technical Disclosure Bulletin, "Hardware Data Recovery at Task Level," vol. 33, No. 6B, Nov. 1990, pp. 201-204.

* cited by examiner

*Primary Examiner*—Kevin L. Ellis
(74) *Attorney, Agent, or Firm*—F. Chau & Associates, LLC (57) ABSTRACT

An atomic transaction includes one or more memory access operations that are completed atomically. A Best-Effort Transaction (BET) system makes its best effort to complete each atomic transaction without guaranteeing completion of all atomic transactions. When an atomic transaction is aborted, BET may provide software with appropriate runtime information such as cause of the abortion. With proper coherence layer enhancements, BET can be implemented efficiently for multiprocessor systems, using caches as buffers for data accessed by atomic transactions. Furthermore, with appropriate fairness support, forward progress can be guaranteed for atomic transactions that incur no buffer overflow.

12 Claims, 4 Drawing Sheets

FIG. 1
(Prior Art)

| Cache State | A-Flag | Color Match ? | A-Load Handling | A-Store Handling |
|---|---|---|---|---|
| I | Don't care | Don't care | Issue Read Request | Issue RWITM Request |
| S | 0 | Don't care | Service A-load<br>Set A-flag<br>Set A-color | Issue Invalidate Request |
| | 1 | Yes | Service A-load | Issue Invalidate Request |
| | | No | Color race | Data race |
| E | 0 | Don't care | Service A-load<br>Set A-flag<br>Set A-color | Service A-store<br>Change cache state to M<br>Set A-flag<br>Set A-color |
| | 1 | Yes | Service A-load | Service A-store<br>Change cache state to M |
| | | No | Color race | Data race |
| M | 0 | Don't care | Service A-load<br>Change cache state to Mar<br>Set A-flag<br>Set A-color | Write data to memory<br>Service A-store<br>Set A-flag<br>Set A-color |
| | 1 | Yes | Service A-load | Service A-store |
| | 1 | No | Service A-load | Data race |
| Mar | 1 | Yes | Service A-load | Write data to memory<br>Service A-store<br>Change state to M |
| | | No | Color race | Data race |

FIG. 2

| Cache State | A-Flag | Read Request | RWITM Request | Invalidate Request |
|---|---|---|---|---|
| S | 0 | No action | Change cache state to I | Change cache state to I |
|  | 1 | No action | Data race | Data race |
| E | 0 | Change cache state to S | Change cache state to I | N/A |
|  | 1 | Change cache state to S | Data race | N/A |
| M | 0 | Write data to memory<br>Supply data to requester<br>Change cache state to S | Write data to memory<br>Supply data to requester<br>Change cache state to I | N/A |
|  | 1 | Data race | Data race | N/A |
| Mar | 1 | Write data to memory<br>Supply data to requester<br>Change cache state to S | Data race | N/A |

FIG. 3

FIG. 4

ARCHITECTURE SUPPORT OF BEST-EFFORT ATOMIC TRANSACTIONS FOR MULTIPROCESSOR SYSTEMS

BACKGROUND OF THE INVENTION

1. Field of the Invention

The present invention relates generally to the field of computer-based memory systems, and, more particularly, to architecture support of atomic transactions for multiprocessor systems.

2. Description of the Related Art

Atomic transactions have been widely used in parallel computing and transaction processing. An atomic transaction generally refers to the execution of multiple operations, such that the multiple operations appear to be executed together without any intervening operations. For example, if a memory address is accessed within an atomic transaction, the memory address should not be modified elsewhere until the atomic transaction completes. Thus, if a processor (or a thread in a multithreading environment) uses an atomic transaction to access a set of memory addresses, the atomic transaction semantics should guarantee that another processor (or another thread) cannot modify any of the memory addresses throughout the execution of the atomic transaction.

Atomic transactions can be implemented at software level with appropriate architecture support. Modem microprocessors generally provide appropriate synchronization instructions, such as test-and-set and compare-and-swap, for supporting atomicity of a read-modify-write operation on a memory address (typically with 4-byte or 8-byte granularity). A program or an operating system can use such synchronization instructions to achieve exclusive acquisition of semaphores for supporting atomic transactions.

The PowerPC® architecture, for example, provides load-and-reserve and store-conditional instructions. When a processor, performs a load-and-reserve instruction on a memory address, the processor reads data from the memory address to a target register; and creates a reservation for the memory address. When the processor later performs a store-conditional instruction on the memory address, if the corresponding reservation remains effective, the processor writes data from a source register to the memory address. However, the reservation for the memory address may get cleared if the memory address is accessed by another processor before the store-conditional instruction is performed. As a result, execution of the store-conditional instruction completes without modifying the memory address.

The PowerPC® architecture supports the following load-and-reserve and store-conditional instructions: lwarx (load word and reserve indexed) and stwcx (store word conditional indexed) for 32-bit data, and ldarx (load double word and reserve indexed) and stdcx (store double word conditional indexed) for 64-bit data. An operating system can use load-and-reserve and store-conditional instructions to implement high-level synchronization functions, such as test-and-set and compare-and-swap, as library primitives. Application programs can use such library primitives, rather than directly using load-and-reserve and store-conditional instructions, to implement atomic transactions as needed.

Atomic transactions can also be implemented directly at architecture level with proper architecture and micro-architecture support, rather than at software level via semaphores and synchronization instructions as described above. Architecture-level atomic transactions, when properly used, can potentially improve overall performance, due to speculative executions of atomic transactions as well as elimination of semaphore acquisitions. Furthermore, using architecture-level atomic transactions can potentially improve software productivity because programmers may not need to worry about using semaphores to achieve desired atomicity semantics. The Transactional Coherence and Consistency ("TCC") model, for example, provides a shared-memory model in which atomic transactions are always the basic units of parallel programming and memory consistency. Supporting atomic transactions architecturally often requires expensive hardware and software enhancements, such as large on-chip buffers for atomic transactions, and software-managed memory regions for on-chip buffer overflows.

A symmetric multiprocessing ("SMP") system usually employs a snoopy mechanism to ensure cache coherence. When a cache miss occurs, the requesting cache may send a cache request to memory and all its peer caches. When a peer cache receives the cache request, the peer cache performs a cache snoop operation and produces a cache snoop response indicating whether the requested data is found. If the requested data is found in a peer cache, the peer cache can source the data to the requesting cache via a cache-to-cache transfer. The memory is responsible for supplying the requested data if the data cannot be supplied by any peer cache.

A number of snoopy cache coherence protocols have been proposed. For example, the MESI coherence protocol and its variations have been widely used in SMP systems. As the name suggests, MESI has four cache states: modified (M), exclusive (E), shared (S) and invalid (I). If a cache line is in an invalid state, the data in the cache is not valid. If a cache line is in a shared state, the data in the cache is valid and can also be valid in other caches. The shared state is entered when the data is retrieved from memory or another cache, and the corresponding snoop responses indicate that the data is valid in at least one of the other caches. If a cache line is in an exclusive state, the data in the cache is valid, and cannot be valid in another cache. Furthermore, the data in the cache has not been modified with respect to the data maintained at memory. The exclusive state is entered when the data is retrieved from memory or another cache, and the corresponding snoop responses indicate that the data is not valid in any other cache. If a cache line is in a modified state, the data in the cache is valid and cannot be valid in another cache. Furthermore, the data has been modified as a result of a store operation, and the memory has not been updated.

When a cache miss occurs, if the requested data is found in both the memory and another cache, supplying the data to the requesting cache via a cache-to-cache transfer is often preferred because cache-to-cache transfer latency is usually smaller than memory access latency. The IBM® Power4 system, for example, enhances the MESI protocol to allow more cache-to-cache transfers. The Power4 system enables data of a shared cache line to be supplied from one cache to another cache in the same module. In addition, when data of a modified cache line is supplied to another cache, the modified data is not necessarily written to the memory at the same time. A cache with the modified data can be held responsible for updating the memory when the modified data is eventually replaced from the cache.

SUMMARY OF THE INVENTION

In one aspect of the present invention, a system for executing transactions is provided. The system includes at least one processor for executing at least one transaction, the at least one processor comprising a first processor for executing a first transaction of the at least one transaction, each of the at least one transaction comprising at least one memory access operation; a shared memory that can be accessed by the at least one processor; a first cache operatively associated with the first processor, wherein the first cache serves as a buffer between the first processor and the shared memory, such that the first cache maintains data accessed by the first transaction throughout the execution of the first transaction; wherein the first cache comprises a first cache line, the first cache line comprising a first flag and a first color; wherein, if the first cache line is currently accessed by the first transaction, the first cache sets the first flag to indicate that the first cache line is currently accessed by some transaction; wherein, if the first cache line is currently accessed by the first transaction, the first cache sets the first color to indicate the first transaction.

In another aspect of the present invention, a method of executing a transaction on a system is provided. The transaction includes at least one memory access operation. The method includes the steps of receiving the transaction from software, the software being executed on the system; executing the transaction on the system, wherein the step of executing the transaction comprises one of: (1) completing the transaction; or (2) aborting the transaction, wherein the step of aborting the transaction comprises one of: (2.1) terminating the transaction, if re-execution of the transaction is certain to cause another abortion; or (2.2) making best-effort to execute the transaction, if re-execution of the transaction is uncertain to cause another abortion, wherein the step of making best-effort to execute the transaction comprises one of: (2.2.1) re-executing the transaction, if the system decides to re-execute the transaction; or (2.2.2) terminating the transaction, if the system decides not to re-execute the transaction.

In yet another aspect of the present invention, a system for executing transactions is provided. The system includes a first instruction, the first instruction enabling software to abort a transaction in a program, the transaction comprising at least one memory access operation; wherein, if the system executes the first instruction throughout the execution of the transaction, the system aborts the execution of the transaction, causing semantic effect of the at least one memory access operation to be cancelled.

BRIEF DESCRIPTION OF THE DRAWINGS

The invention may be understood by reference to the following description taken in conjunction with the accompanying drawings, in which like reference numerals identify like elements, and in which.

DETAILED DESCRIPTION OF PREFERRED EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It is to be understood that the systems and methods described herein may be implemented in various forms of hardware, software, firmware, special purpose processors, or a combination thereof. In particular, at least a portion of the present invention is preferably implemented as an application comprising program instructions that are tangibly embodied on one or more program storage devices (e.g., hard disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying figures are preferably implemented in software, the connections between system modules (or the logic flow of method steps) may differ depending upon the manner in which the present invention is programmed. Given the teachings herein, one of ordinary skill in the related art will be able to contemplate these and similar implementations of the present invention.

Efficient architecture support of atomic transactions may be provided by appropriately handling a number of issues at both architecture interface and implementation levels. An adequate architecture interface is needed to allow atomic transactions to be used in programs as needed. It is also generally desirable that the semantics of the architecture interface define many aspects of atomic transactions, such as whether registers modified in an atomic transaction should be restored when the atomic transaction is aborted, whether memory accesses of an atomic transaction can be interleaved with other memory accesses that are not part of the atomic transaction, whether an atomic transaction can be nested in another atomic transaction, whether a thread executing an atomic transaction can be context switched, and whether forward progress can be guaranteed for each atomic transaction or for at least one atomic transaction. Furthermore, implementing atomic transactions generally requires temporary buffering for data accessed by atomic transactions. As a result, it is generally desirable to have a mechanism for handling buffer overflow, which is rare but possible.

We propose Best-Effort Transaction ("BET"), which can be implemented in modern multiprocessor systems, such as SMP systems, with low implementation cost. As the name suggests, a BET system makes its best effort to complete an atomic transaction, but may abort an atomic transaction if, for example, the atomic transaction causes a data race or buffer overflow. When an atomic transaction is aborted, software can be informed via the BET architecture interface with appropriate runtime information such as cause of the abortion. It should be noted that BET can be easily incorporated into modem microprocessors, because it allows transaction abortion, especially in the case of buffer overflows. With proper coherence layer enhancements, an efficient BET implementation can employ caches as buffers for atomic transactions. Furthermore, with appropriate fairness support, BET can guarantee forward progress for atomic transactions that incur no buffer overflow.

We now define an exemplary BET architecture interface, and present an illustrative BET implementation for a snoopy-based SMP system.

BET Architecture Interface

Supporting best-effort atomic transactions at architecture level generally requires appropriate Instruction Set Architecture ("ISA") extensions. A BET architecture interface defines a set of primitives that allow best-effort atomic transactions to be used in programs. For example, it enables software to describe an atomic transaction that includes multiple memory accesses, without using traditional semaphore-based synchronizations.

An exemplary BET architecture interface includes a BET-start instruction that marks the beginning of an atomic transaction, and a BET-end instruction that marks the end of an atomic transaction. In one embodiment, the BET-start instruction can specify an abort-target-address that points to the first instruction to be executed should the atomic transaction fail to complete. Alternatively, rather than letting software explicitly define an abort-target-address for an atomic transaction, the BET system can implicitly use some default address, such as the address of the instruction following the BET-end instruction, as the abort-target-address for the atomic transaction. In addition, the BET architecture interface can include a BET-abort instruction that allows software to abort an atomic transaction voluntarily. This can be useful, for example, when software detects that, according to runtime information supplied from the underlying BET system, an atomic transaction has been aborted many times due to heavy data races.

In one embodiment, the BET interface architecture defines a BET status register to provide software with runtime information of atomic transactions. Alternatively, the BET interface can allow software to specify a register or memory location that is updated with proper runtime information whenever an atomic transaction is aborted or completed. Exemplary runtime information for an atomic transaction includes the following:

Whether the transaction is committed or aborted;
Whether the transaction is aborted due to a data race;
Whether the transaction is aborted due to a color race;
Whether the transaction is aborted due to a replacement conflict;
Whether the transaction is aborted due to a buffer overflow;
Number of times the transaction is aborted due to a data race;
Number of times the transaction is aborted due to a color race;
Number of times the transaction is aborted due to a replacement conflict;
Number of times the transaction has been re-executed;
Number of cache lines accessed by the transaction;
Number of cache lines read by the transaction; and
Number of cache lines modified by the transaction.

The semantics of BET allows an atomic transaction to be aborted. One critical semantic issue is determining whether registers modified by an atomic transaction are restored when the atomic transaction is aborted. While restoring registers is usually preferred from the perspective of software, doing so may cause complication in hardware. Different semantic definitions on this issue can affect how BET is used in programs.

Another critical semantic issue is determining whether memory operations of an atomic transaction can be interleaved with regular memory operations that are not part of the atomic transaction. With the architecture interface described above, memory access operations between BET-start and BET-end are all included in the corresponding atomic transaction. If desired, this interface can be extended to enable regular load and store instructions to appear in an atomic transaction. For example, a memory instruction can include a flag indicating whether the memory instruction is a regular memory operation. Alternatively, the architecture interface can allow software to specify a memory region for an atomic transaction, wherein the memory region defines a set of memory addresses. As a result, a memory operation should not be treated as part of the atomic transaction should the memory operation access an address outside the memory region.

Allowing atomic transactions to include regular memory access operations can have a profound impact on complexity of atomic transactions, although it may reduce occurrences of transaction abortions. Unlike a cache line accessed by an atomic transaction, a cache line accessed by a regular memory operation may be replaced without causing any atomic transaction to be aborted. This is because, when an atomic transaction is aborted, a memory update caused by a regular memory operation in the aborted atomic transaction may not need to be cancelled.

It should be appreciated that semantics of BET-start and BET-end can be associated with the first memory access operation and to the last memory access operation, respectively, of an atomic transaction. For example, a memory load instruction in a special form can mark the beginning of an atomic transaction. Likewise, a memory store instruction in a special form can mark the end of an atomic transaction. Merging BET-start and BET-end instructions with load and store instructions can reduce the number of instructions to be executed for an atomic transaction. This can be useful when an atomic transaction includes only a small number of instructions.

Implementing BET at Cache Coherence Layer

We demonstrate that BET can be efficiently implemented with proper coherence layer enhancements for an SMP system that uses a MESI coherence protocol to achieve cache coherence. Caches are used as temporary buffers for atomic transactions, and the MESI coherence protocol is extended with BET support, including coherence maintenance and race detection. Those skilled in the art will appreciate that the implementation technique is applicable to any of a variety of coherence protocols, such as the protocol found in IBM® Power4 systems and directory-based protocols found in large-scale shared-memory systems. Although the implementation technique is used to support best-effort atomic transactions, those skilled in the art will appreciate that, the implementation technique can be used to support transactions in general and thread-level speculative executions.

Figure 1:
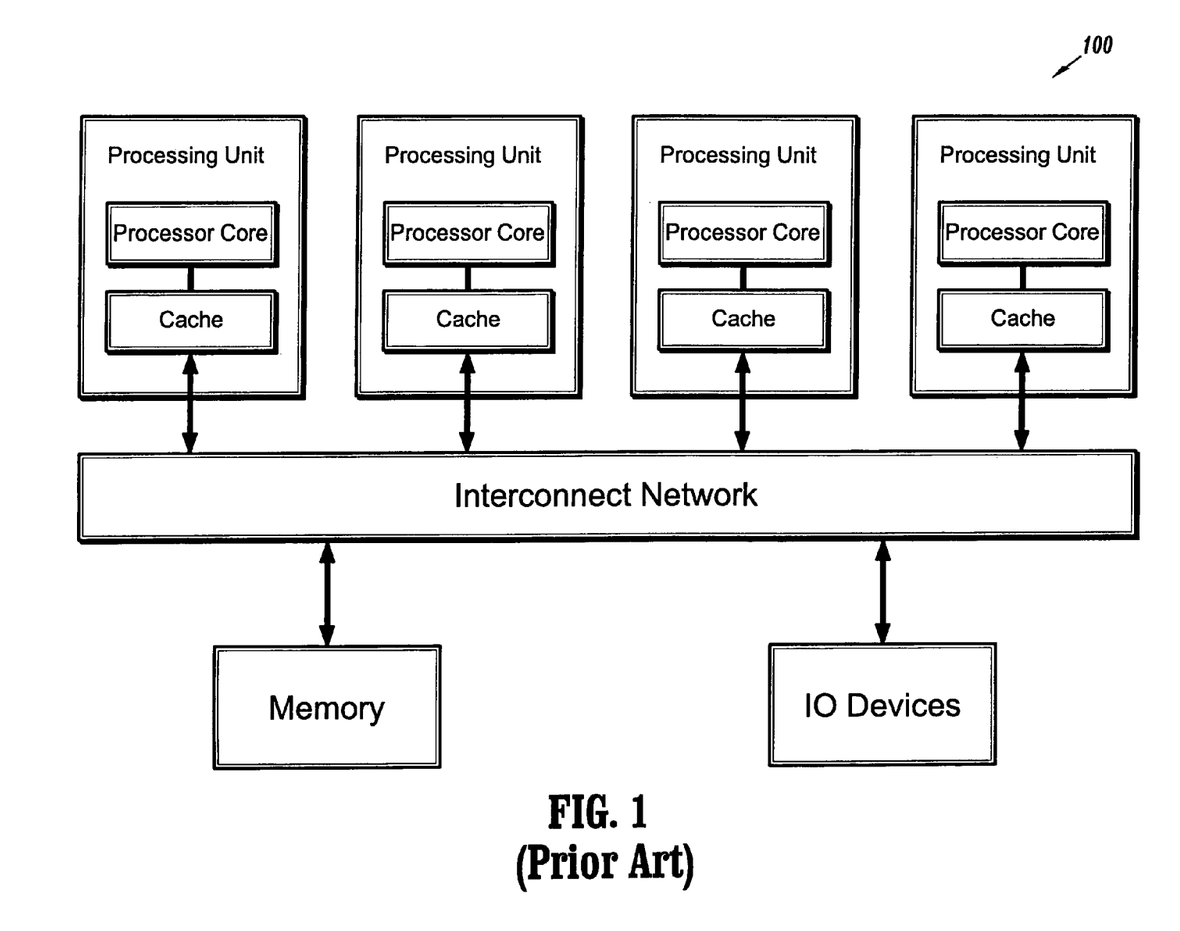
FIG. 1 depicts a block diagram illustrating an exemplary SMP system.

Referring now to FIG. 1, an exemplary SMP system is shown that includes multiple processing units interconnected via an interconnect network. Each processing unit includes a processor core and a cache, wherein the processor core can run multiple threads simultaneously. Also connected to the interconnect network are a memory and some input/output devices. The memory can be physically distributed into multiple memory portions, wherein each memory portion is operatively associated with a processing unit. Cache coherence is maintained via a MESI cache coherence protocol.

In an illustrative embodiment, each memory access operation includes an atomic flag and an atomic color, hereafter referred to as A-flag and A-color, respectively. The A-flag indicates whether the memory access operation is part of an atomic transaction, and the A-color represents from which atomic transaction the memory access is generated. For example, the A-color may simply be the corresponding processor identifier or thread identifier. As used herein, a load memory operation is referred to as an A-load operation if its A-flag is set, and a store memory operation is referred to as an A-store operation if its A-flag is set.

Each cache line is augmented with an A-flag and an A-color, wherein the A-flag indicates whether the corresponding cache line has been accessed by an uncommitted atomic transaction, and the A-color indicates which uncommitted atomic transaction has accessed the cache line. When an atomic transaction accesses a cache line, the A-flag is set; when an atomic transaction is completed or aborted, the A-flag of each cache line that has been accessed by the atomic transaction is cleared. The A-color distinguishes multiple atomic transactions that may potentially access the cache at the same time. This can happen, for example, when multiple threads run on the same processor, or when multiple processors share the same cache.

When two atomic transactions access a cache line simultaneously, and at least one of the two atomic transactions modifies the cache line, one of the two atomic transactions should be aborted to ensure atomicity of each transaction. This scenario is commonly referred to as a data race. A data race can be caused by either a true sharing or a false sharing. A true sharing happens when two atomic transactions access the same data item; and a false sharing happens when the two atomic transactions access different portions of the same cache line. An aborted transaction due to a data race may be re-executed by the system without software involvement.

When an atomic transaction reads a cache line that is currently read by another atomic transaction, although neither atomic transaction modifies the cache line, one of the two atomic transactions is preferably aborted since each cache line can record no more than one color. This scenario is referred to as color race. An alternative implementation may choose to maintain multiple colors in case of a color race so that neither transaction needs to be aborted.

An atomic transaction is uncommitted when it is being executed, and is committed when it is completed. When caches are used as buffers for uncommitted atomic transactions, it is important to ensure that any memory modification from an atomic transaction can be cancelled if the atomic transaction is aborted. Thus, if a cache line is modified by an atomic transaction, the modified cache line should not be written to memory until the atomic transaction is committed. If an atomic transaction is aborted, all cache lines modified by the atomic transaction need to be invalidated. In addition, when an atomic transaction intends to modify a cache line that has been modified by a regular memory operation, data of the cache line should be written to memory before the cache line can be modified by the atomic transaction.

When an atomic transaction reads a cache line that has been modified by a regular memory operation, data of the modified cache line does not need to be immediately written to memory. A new cache state (in addition to the four MESI states), Mar ("Modified with atomic read"), can be used for representing that a cache line has been modified by a regular memory operation, the modified data has not been written to memory, and the cache line has been read by an uncommitted atomic transaction.

It should be noted that a cache line in an invalid state generally has its A-flag cleared, and a cache line in a Mar state generally has its A-flag set. In addition, a cache line generally needs to maintain the A-color only when its A-flag is set. The atomic flag and color information of a cache line can be encoded with a cache state to reduce storage overhead.

One important issue in BET implementation is handling of buffer overflow due-to capacity and associativity constraints of caches that are used as buffers for atomic transactions. For example, when an atomic transaction needs to modify data of more than 4 cache lines that are mapped to the same cache line set in a 4-way set-associative cache, the cache cannot maintain all the modified data. Although providing backup storage such as victim buffers can reduce buffer overflow occurrences, buffer overflow generally cannot be eliminated without expensive support. A reasonable BET implementation can simply abort the atomic transaction that causes a buffer overflow, and inform software with proper information so that necessary action can be taken at software level.

We now describe a number of BET implementation issues, including (1) atomic load handling, (2) atomic store handling, (3) data race detection, (4) color race detection, (5) replacement conflict and buffer overflow, (6) aborting an atomic transaction, (7) committing an atomic transaction, (8) fairness and forward progress, (9) backup buffering, and (10) using multi-level caches for transactions. It should be appreciated that the numbering and lettering used herein is solely for organizational purposes and is not intended to indicate any specific ordering of steps.

(1) Atomic Load Handling

A cache handles an A-load operation of an atomic transaction as follows:

- If the cache-state is I, the cache issues a read request. When requested data later arrives, the cache (a) caches the data in an S state, (b) sets the A-flag of the cache line, and (c) sets the A-color of the cache line to record the A-color of the A-load operation. Meanwhile, the pending A-load operation is serviced with the data. However, if an abort signal is received from another cache due to a data race, the atomic transaction is aborted.
- If the cache state is S or E, and the A-flag is not set, the cache (a) sets the A-flag of the cache line, and (b) sets the A-color of the cache line to record the A-color of the A-load operation. The A-load operation is serviced with data of the cache line.
- If the cache state is S or E, the A-flag is set, and the A-color matches the A-color of the A-load operation, the A-load operation is serviced with data of the cache line.

If the cache state is S or E, the A-flag is set, and the A-color is different from the A-color of the A-load operation, a color race is detected. As a result, one of the two atomic transactions is aborted.

If the cache state is M and the A-flag is not set, the cache (a) sets the A-flag of the cache line, (b) sets the A-color of the cache line to record the color of the A-load operation, and (c) changes the cache state to Mar. The A-load operation is serviced with data of the cache line. The Mar state indicates that the cache line has been modified by a regular memory store operation, the modified data has not been written back to memory, and the modified data has been read by an A-load operation.

If the cache state is M, the A-flag is set, and the A-color matches the A-color of the A-load operation, the A-load operation is serviced with data of the cache line.

If the cache state is M, the A-flag is set, and the A-color is different from the A-color of the A-load operation, a data race is detected. As a result, one of the two atomic transactions is aborted.

If the cache state is Mar, and the A-color matches the A-color of the A-load operation, the A-load operation is serviced with data of the cache line.

If the cache state is Mar, and the A-color is different from the A-color of the A-load operation, a color race is detected. Consequently, one of the two atomic transactions is aborted.

(2) Atomic Store Handling

A cache handles an A-store operation of an atomic transaction as follows:

If the cache state is I, the cache issues a RWITM ("Read-With-Intent-To-Modify") request. When the cache receives requested data and snoop responses indicating that all other copies have been invalidated, the cache (a) caches the data in an M state, (b) sets the A-flag of the cache line, and (c) sets the A-color of the cache line to record the A-color of the A-store operation. Meanwhile, the pending A-store operation is performed on the cache line. However, if an abort signal is received from another cache due to a data race, the atomic transaction is aborted.

If the cache state is S and the A-flag is not set, the cache issues an invalidate request for the exclusive ownership. When the cache receives snoop responses indicating that all other copies have been invalidated, the cache (a) changes the cache state to M, (b) sets the A-flag of the cache line, and (c) sets the A-color of the cache line to record the A-color of the A-store operation. Meanwhile, the pending A-store operation is performed on the cache line. However, if an abort signal is received from another cache due to a data race, the atomic transaction is aborted.

If the cache state is S, the A-flag is set, and the A-color matches the A-color of the A-store operation, the cache issues an invalidate request for the exclusive ownership. When the cache receives snoop responses indicating that all other copies have been invalidated, the cache changes the cache state to M. Meanwhile, the pending A-store operation is performed on the cache line. However, if an abort signal is received from another cache due to a data race, the atomic transaction is aborted.

If the cache state is S, the A-flag is set, and the A-color is different from the A-color of the A-store operation, a data race is detected. As a result, one of the two atomic transactions is aborted.

If the cache state is E and the A-flag not set, the cache (a) changes the cache state to M, (b) sets the A-flag of the cache line, and (c) sets the A-color of the cache line to record the A-color of the A-store operation. The A-store operation is performed on the cache line.

If the cache state is E, the A-flag is set, and the A-color matches the A-color of the A-store operation, the cache changes the cache state to M. The A-store operation is performed on the cache line.

If the cache state is E, the A-flag is set, and the A-color is different from the A-color of the A-store operation, a data race is detected. As a result, one of the two atomic transactions is aborted.

If the cache state is M and the A-flag is not set, the cache (a) writes data of the cache line back to memory, (b) sets the A-flag of the cache line, and (c) sets the A-color of the cache line to record the A-color of the A-store operation. The A-store operation is then performed on the cache line.

If the cache state is M, the A-flag is set, and the A-color matches the A-color of the A-store operation, the A-store operation is performed on the cache line.

If the cache state is M, the A-flag is set, and the A-color is different from the A-color of the A-store operation, a data race is detected. As a result, one of the two atomic transactions is aborted.

If the cache state is Mar, and the A-color matches the A-color of the A-store operation, the cache (a) writes the data back to the memory, and (b) changes the cache state to M. The A-store operation is then performed on the cache line.

If the cache state is Mar, and the A-color is different from the A-color of the A-store operation, a data race is detected. As a result, one of the two atomic transactions is aborted.

Figure 2:
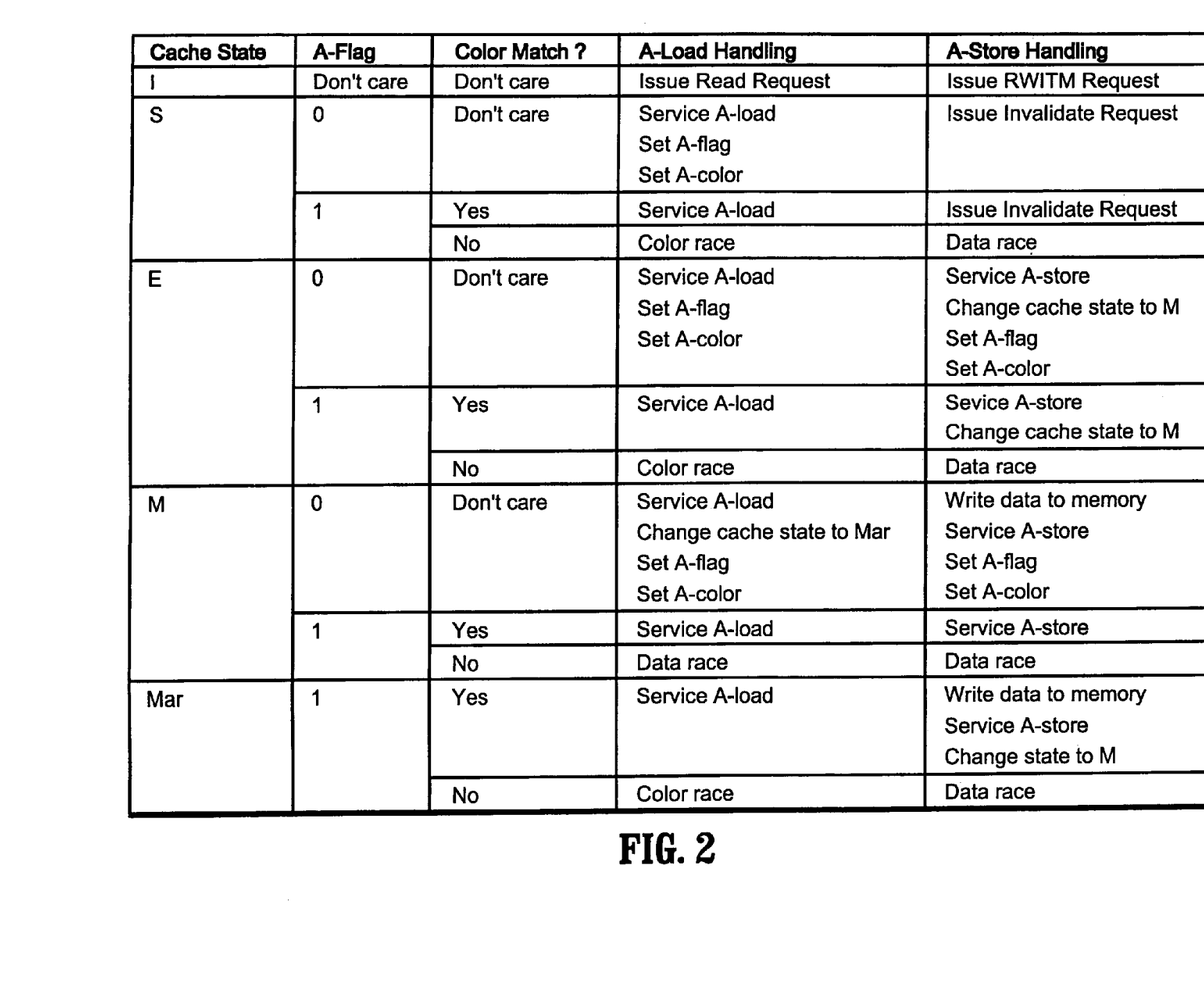
FIG. 2 depicts a table summarizing coherence actions that a cache controller at the requesting side may perform to service an atomic memory operation, in accordance with one exemplary embodiment of the present invention.

Referring now to FIG. 2, a table is shown summarizing coherence actions that a requesting cache may perform to service an atomic memory operation, given the cache state and the atomic flag of a requested cache line. An atomic memory operation is typically generated by a processor executing an atomic transaction.

Figure 3:
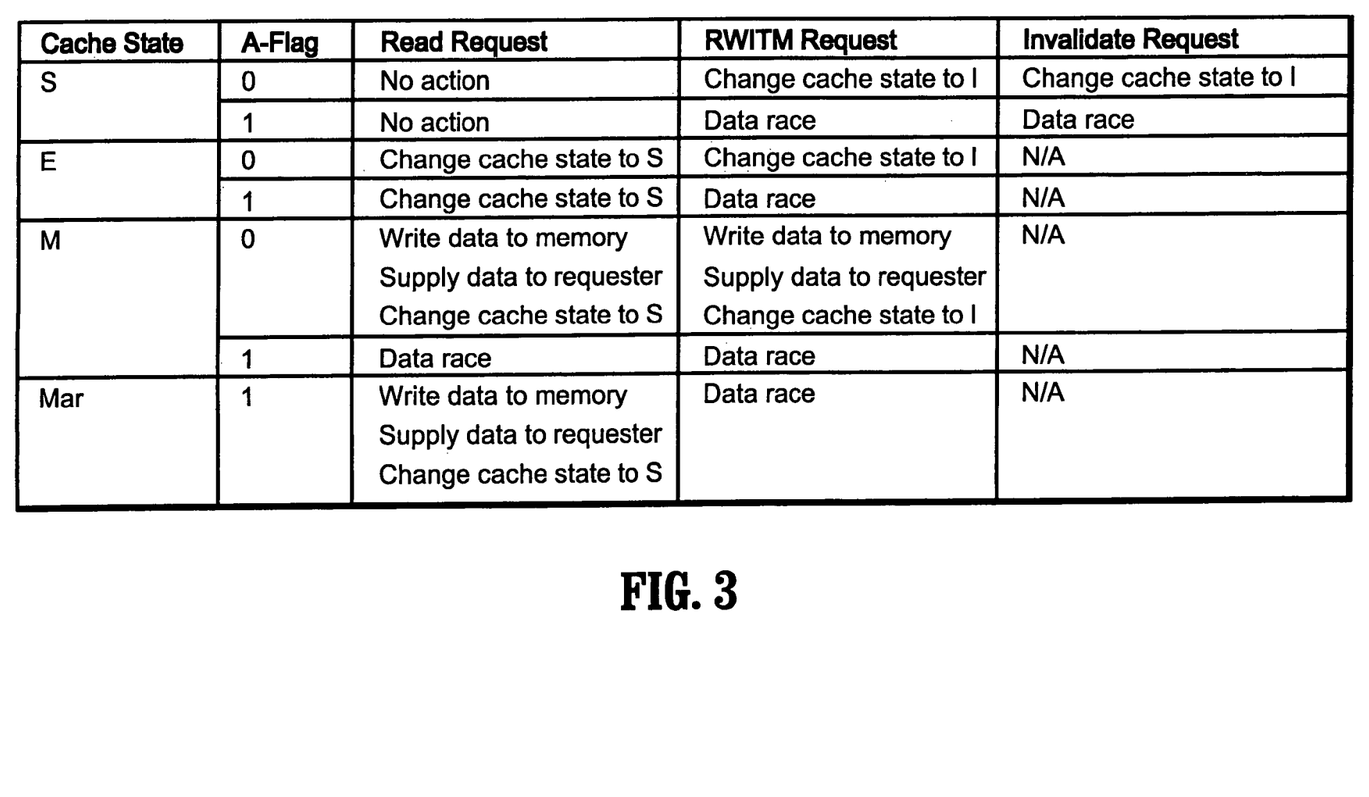
FIG. 3 depicts a table summarizing coherence actions that a cache controller at the snooping side may perform to service an incoming snoop request, in accordance with one exemplary embodiment of the present invention.

Referring now to FIG. 3, another table is shown summarizing coherence actions that a snooping cache may perform to service an incoming snoop request generated by an atomic memory operation, given the cache state and the atomic flag of a snooped cache line. A snoop request can be a read request, a RWITM request or an invalidate request issued from a requesting cache.

(3) Data Race Detection

A data race can happen between atomic transactions that are executed on the same cache, or between atomic transactions that are executed on different caches. When a cache receives an atomic memory operation generated by an atomic transaction, a data race can be detected as follows:

When the cache receives an A-load operation, the cache detects a data race if the requested cache line is in an M state with its A-flag set, and the A-color of the cache line is different from the A-color of the A-load operation.

When the cache receives an A-store operation, the cache detects a data race if the requested cache line is in an S, E, M or Mar state with its A-flag set, and A-color of the cache line is different from the A-color of the A-store operation.

Likewise, when a snooping cache receives a snoop request from a requesting cache, a data race can be detected as follows:

When the snooping cache receives a read request, the snooping cache detects a data race if the requested cache line is in an M state with its A-flag set.

When the snooping cache receives a RWITM or invalidate request, the snooping cache detects a data race if the requested cache line is in an S, E, M or Mar state with its A-flag set.

When a cache detects a data race between two atomic transactions accessing the same cache, the cache can choose to abort either of the two atomic transactions. An appropriate fairness policy can be employed to determine which of the two atomic transactions is preferably aborted. Similarly, when a snooping cache detects a data race between a local atomic transaction accessing the snooping cache and a remote atomic transaction accessing the requesting cache, the snooping cache can choose to abort the local atomic transaction, or issue an abort signal to abort the remote atomic transaction. The abort signal can be included in a cache snoop response from the snooping cache to the requesting cache.

It should be noted that a data race may happen between an atomic transaction and a regular memory operation. For example, a cache may detect a data race between an atomic transaction executed on the cache and a regular memory operation executed on another cache. In this case, the regular memory operation can be retried to avoid aborting the atomic transaction. Alternatively, an implementation may treat the regular memory operation itself as a trivial atomic transaction that includes only one memory operation.

(4) Color Race Detection

A color race can happen between two atomic transactions running on the same cache, if the two atomic transactions intend to read the same cache line at the same time. When a cache receives an A-load operation generated by an atomic transaction, the cache detects a color race if requested cache line is in an S, E or Mar state with its A-flag set, and the A-color of the cache line is different from the A-color of the A-load operation. When a color race is detected, the cache can choose to abort either of the two atomic transactions. Like data race handling, a fairness policy can be used to decide which of the two atomic transactions should be aborted.

(5) Replacement Conflict and Buffer Overflow

When a cache miss occurs in a cache, a cache replacement mechanism can be used to select a cache line to be replaced. If a cache line with its A-flag set is replaced, the atomic transaction identified by the corresponding A-color usually needs to be aborted. To avoid unnecessary atomic transaction abortion, the cache replacement mechanism generally prefers to select, among all eligible cache lines, a cache line that is currently not accessed by any atomic transaction for cache line replacement. Given a cache miss, an eligible cache line is a cache line that can be replaced with requested data of the cache miss.

When a cache miss occurs due to either a regular memory operation or an atomic memory operation, if each eligible cache line is currently accessed by an atomic transaction, the cache line replacement mechanism preferably determines according to some fairness policy, which eligible cache line should be replaced. An atomic transaction is preferably aborted when a cache line accessed by the atomic transaction is replaced. This scenario is referred to as replacement conflict.

When an atomic transaction causes a cache miss, if all eligible cache lines are currently accessed by the same atomic transaction, a buffer overflow is detected. In this case, the atomic transaction is preferably aborted, and software is notified with runtime information so that appropriate actions can be taken.

(6) Aborting an Atomic Transaction

An atomic transaction can be aborted when a data race, color race, replacement conflict or buffer overflow happens. When an atomic transaction is aborted, for each cache line of which the A-flag is set and of which the A-color matches the color of the aborted atomic transaction, the cache clears the A-flag. In addition, if the cache state is M, it is set to I; if the cache state is Mar, it is set to M.

When an atomic transaction is aborted, software may be informed of not only the abortion but also the cause of the abortion. An aborted atomic transaction can be re-executed without software involvement. With appropriate fairness support, forward progress can be guaranteed for each atomic transaction or for at least one atomic transaction, in the absence of buffer overflow.

It should be appreciated that, when an atomic transaction is aborted due to a data race, color race or replacement conflict, the system can choose to make its best effort by automatically re-executing the aborted atomic transaction a number of times, regardless of whether forward progress needs to be guaranteed. If the atomic transaction still cannot be completed, the system stops executing the atomic transaction and provides software with appropriate runtime information, such as the number of times the atomic transaction is aborted.

When a buffer overflow causes a transaction abortion, it generally is impractical for the system to re-execute the aborted transaction, since doing so would cause a buffer overflow again. In this case, software may take appropriate actions (e.g., using explicit semaphores to ensure mutual exclusion of memory accesses from different atomic transactions) to achieve the objective of the aborted atomic transaction.

(7) Committing an Atomic Transaction

When an atomic transaction is committed, for each cache line of which the A-tag is set and of which the A-color matches the color of the committed atomic transaction, the cache clears the A-tag. In addition, if the cache state is Mar, it is changed to M.

When an atomic transaction is committed, the system can provide software with valuable runtime information such as the number of times the atomic transaction has been re-executed and the number of cache lines the atomic transaction has modified. Such runtime information can be helpful for, for example, software profiling and dynamic compiler optimization.

It should be noted that, when an atomic transaction is committed or aborted, appropriate cleanup actions are preferably taken for all cache lines with set A-tag and matched A-color. In one embodiment, this can be achieved with simple color-match logic for each cache line. Alternatively, a walk-through mechanism can be incorporated to check cache lines in multiple steps.

(8) Fairness and Forward Progress

When a data race or color race is detected between two atomic transactions, one of the two atomic transactions is preferably aborted according to some fairness policy. An appropriate fairness policy can reduce occurrences of transaction abortions, therefore improving overall performance.

While deciding which atomic transaction needs to be aborted, a fairness policy may take into account an estimated abortion cost. For example, a simple abort-late-corner policy preferably aborts the atomic transaction that causes the detection of a data race, color race or replacement conflict. The policy can be described in more detail as follows:

- When a cache receives an atomic load operation from transaction $T_2$, if requested cache line is modified by transaction $T_1$, according to its cache state, A-flag and A-color, the cache aborts transaction $T_2$;
- When a cache receives an atomic store operation from transaction $T_2$, if requested cache line is accessed by transaction $T_1$, according to its cache state, A-flag and A-color, the cache issues an abort signal to abort transaction $T_2$;
- When a snooping cache receives a read request from transaction $T_2$ that is executed on a requesting cache, if requested cache line is modified by transaction $T_1$, according to its cache state, A-flag and A-color, the snooping cache sends an abort signal to the requesting cache to abort transaction $T_2$;
- When a snooping cache receives a RWITM or invalidate request from transaction $T_2$ that is executed on a requesting cache, if requested cache line is accessed by transaction $T_1$ according to its cache state, A-flag and A-color, the snooping cache sends an abort signal to the requesting cache to abort transaction $T_2$.
- When a cache receives an atomic load operation from transaction $T_2$, if requested cache line is read by transaction $T_1$ according to its cache state, A-flag and A-color, the cache aborts transaction $T_2$; and
- When a cache miss occurs due to an atomic memory operation, if all eligible cache lines are currently accessed by atomic transactions, the cache aborts the transaction that causes the cache miss.

Forward progress can be achieved with decent fairness support, provided that no buffer overflow happens. An exemplary fairness mechanism defines a total order for colors that can be used for atomic transactions, wherein each color generally comprises the processor/thread identifier of the processor/thread on which the corresponding atomic transaction is executed. Whenever a data race, a color race or a replacement conflict occurs, the atomic transaction with the lowest-priority color is aborted. An aborted atomic transaction is automatically re-executed. This fairness policy ensures forward progress for at least one atomic transaction at any time in the absence of buffer overflow.

In another exemplary fairness mechanism, each atomic transaction is associated with a unique timestamp that indicates the starting time of the atomic transaction. In case of a data race, color race or replacement conflict, the atomic transaction with the latest timestamp is aborted. When an atomic transaction is aborted, it is typically re-executed with the same timestamp until its completion. This fairness policy ensures forward progress for each atomic transaction in the absence of buffer overflow. For example, it guarantees that, with 8-way set associative caches and a 128B cache line size, an atomic transaction accessing no more than eight 128B memory blocks can always complete.

(9) Backup Buffering

Providing appropriate backup buffering can reduce occurrences of transaction abortions due to buffer overflow. For example, a small fully-associative victim cache can be employed to maintain replaced cache lines accessed by atomic transactions. This can be particularly helpful for caches with small associativity.

When a cached line accessed by an atomic transaction is replaced from a cache, if the cache line has been modified by the atomic transaction, data of the cache line should be maintained in a backup buffer to avoid aborting the atomic transaction. However, if the cache line is modified by the atomic transaction, there is no need to maintain data of the cache line, provided that the cache somehow records that the replaced cache line is read by the atomic transaction (this information may be used for data race detection). This suggests a backup buffer mechanism that includes a W-buffer for maintaining data of replaced cache lines that are modified by uncommitted atomic transactions, and an R-buffer for maintaining addresses of replaced cache lines that are read but not modified by uncommitted atomic transactions.

(10) Using Multi-level Caches

Although not so limited, the illustrative embodiment above demonstrates how L1 caches can be used to support atomic transactions. Those skilled in the art will appreciate that, for SMP systems with varying cache hierarchies, atomic transactions can use multi-level caches. When a cache is used for atomic transactions, all of its high-level caches are preferably enhanced with proper support for atomic transactions.

Consider an exemplary SMP system that includes a number of processing units, wherein each processing unit includes a processor core, an L1 cache and an L2 cache. The SMP system maintains cache coherence among L2 caches, and extends its cache coherence layer to support atomic transactions at L2 level. Correspondingly, an L1 cache also includes an A-flag and an A-color for each cache line, allowing data races to be detected without consulting the corresponding L2 cache. The L2 cache can be considered as a backup buffer for the L1 cache. Thus, when an L1 cache detects a color race, replacement conflict or cache overflow, it is possible that no atomic transaction should be aborted, if the corresponding L2 cache can hold information of the cache line that is evicted from the L1 cache.

Exemplary Method of Executing a Best-Effort Transaction

Figure 4:
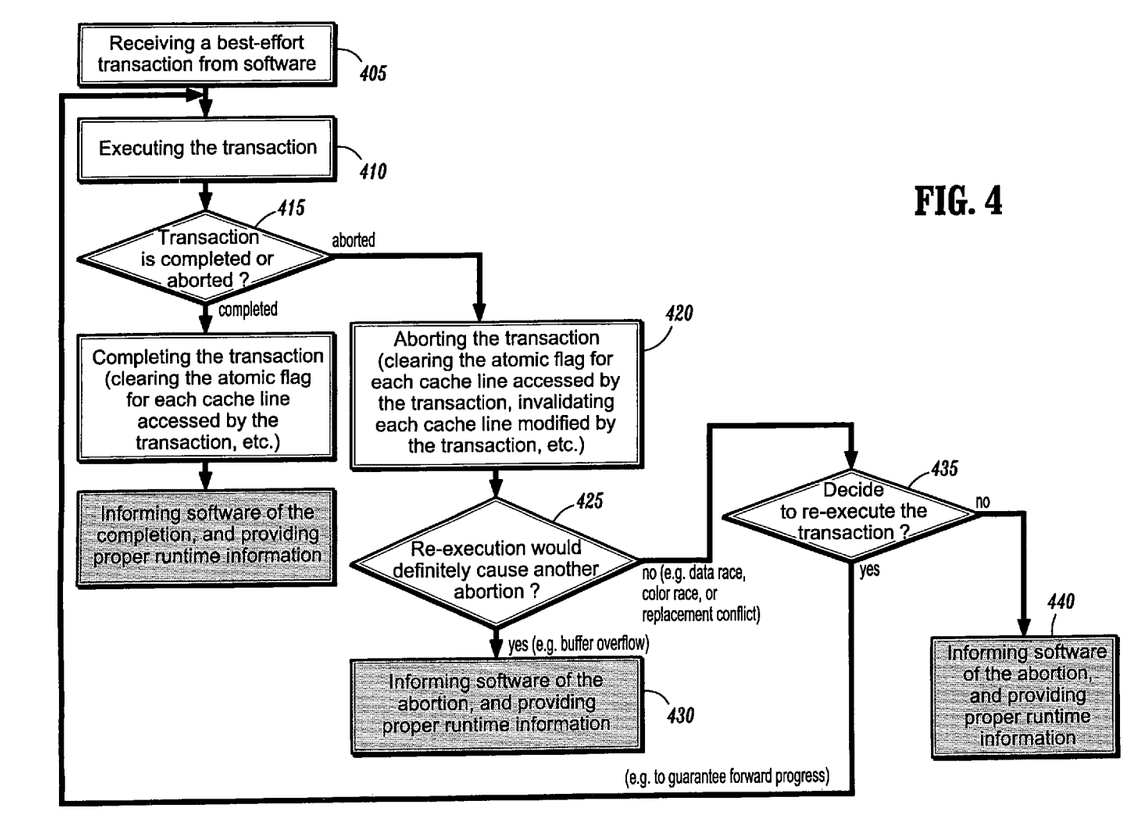
FIG. 4 depicts a flow diagram illustrating a method of executing a best-effort transaction, in accordance with one exemplary embodiment of the present invention.

Referring now to FIG. 4, a flow diagram is shown illustrating an exemplary method of executing a best-effort transaction. A best-effort transaction is received from software (at 405). When the system executes (at 410) a transaction, the transaction can be either completed or aborted (at 415). If the transaction is aborted (at 420), the system determines (at 425), based on the cause of the abortion, whether re-execution of the transaction is certain to cause another abortion. If the abortion is caused by a buffer overflow, the system terminates (at 430) executing the transaction and informs software appropriately, because re-execution of the transaction is certain to cause another abortion. However, if the abortion is caused by a data race, a color race or a replacement conflict, the system makes (at 435) its best-effort to execute the transaction since re-execution of the transaction is uncertain to cause another abortion. While making its best effort to execute the transaction, the system may determine to re-execute the transaction (at 410) if, for example, forward progress needs to be guaranteed. Alternatively, the system may determine to terminate (at 440) executing the transaction if, for example, the transaction has been re-executed and aborted many times.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A system for executing transactions, comprising
at least one processor for executing at least one transaction, the at least one processor comprising a first processor for executing a first transaction of the at least one transaction, each of the at least one transaction comprising at least one memory access operation;
a shared memory that can be accessed by the at least one processor; and
a first cache operatively associated with the first processor, wherein the first cache serves as a buffer between the first processor and the shared memory, such that the first cache maintains data accessed by the first transaction throughout the execution of the first transaction;
wherein the first cache comprises a first cache line, the first cache line comprising a first flag and a first color;
wherein, if the first cache line is currently accessed by the first transaction, the first cache sets the first flag to indicate that the first cache line is currently accessed by some transaction;
wherein, if the first cache line is currently accessed by the first transaction, the first cache sets the first color to indicate the first transaction.

2. The system of claim 1,
wherein, when the execution of the first transaction is completed, the first cache clears the first flag to indicate that the first cache line is not currently accessed by any transaction; and
wherein, when the execution of the first transaction is aborted prior to completion, the first cache (a) clears the first flag to indicate that the first cache line is not currently accessed by any transaction, and (b) invalidates the first cache line if the first cache line is modified by the first transaction.

3. The system of claim 2, wherein the first cache aborts one of the first transaction or a second transaction of the at least one transaction, if the first cache detects at least one of a data race, a color race, or a replacement conflict, between the first transaction and the second transaction.

4. The system of claim 3, further comprising
a second cache operatively associated with a second processor of the at least one processor, the second processor for executing the second transaction;
wherein the second cache serves as a buffer between the second processor and the shared memory, such that the second cache maintains data accessed by the second transaction throughout the execution of the second transaction; and
wherein the first cache detects a data race between the first transaction and the second transaction, if at least one of the following conditions is true:
(a) the first cache receives a snoop request from the second cache, the snoop request indicating that the second transaction intends to modify data of the first cache line, the first cache line being currently accessed by the first transaction; or
(b) the first cache receives a snoop request from the second cache, the snoop request indicating that the second transaction intends to read data of the first cache line, the first cache line being currently modified by the first transaction.

5. The system of claim 3,
wherein the first cache, in addition to maintaining data accessed by the first transaction throughout the execution of the first transaction, further maintains data accessed by the second transaction throughout the execution of the second transaction, the second transaction being executed by one of the first processor or a second processor of the at least one processor; and
wherein the first cache detects a data race between the first transaction and the second transaction, if at least one of the following conditions is true:
(a) the first cache receives a memory write operation, the memory write operation indicating that the second transaction intends to modify the first cache line, the first cache line being currently accessed by the first transaction; or
(b) the first cache receives a memory read operation, the memory read operation indicating that the second transaction intends to read the first cache line, the first cache line being currently modified by the first transaction.

6. The system of claim 3,
wherein the first cache, in addition to maintaining data accessed by the first transaction throughout the execution of the first transaction, further maintains data accessed by the second transaction throughout the execution of the second transaction, the second transaction being executed by one of the first processor or a second processor of the at least one processor; and
wherein the first cache detects a color race between the first transaction and the second transaction, if the first cache receives a memory read operation, the memory read operation indicating that the second transaction intends to read the first cache line, the first cache line being currently read, but not modified, by the first transaction.

7. The system of claim 3,
wherein the first cache, in addition to maintaining data accessed by the first transaction throughout the execution of the first transaction, further maintains data accessed by the second transaction throughout the execution of the second transaction, the second transaction being executed by one of the first processor or a second processor of the at least one processor; and
the first cache detects a replacement conflict between the first transaction and the second transaction, if (a) the first cache line is currently accessed by the first transaction, (b) the first cache receives a memory access operation generated from the second transaction, the memory access operation causing a cache miss in the first cache, and (c) a cache line replacement mechanism associated with the first cache suggests that the first cache line be used to hold requested data of the memory access operation.

8. The system of claim 3, further comprising a fairness mechanism associated with the first cache, the fairness mechanism determining which one of the first transaction or the second transaction is aborted, when the first cache detects at least one of a data race, a color race or a replacement conflict, between the first transaction and the second transaction.

9. The system of claim 2,
wherein, when the first transaction performs a memory write operation on the first cache line, if (a) the first cache line has been modified by some memory write operation, (b) data of the first cache line has not been written to the shared memory, and (c) the first cache line is currently not accessed by any transaction, the first cache writes data of the first cache line to the shared memory before the memory write operation is performed.

10. The system of claim 2, wherein, when the first transaction performs a memory read operation on the first cache line, if (a) the first cache line has been modified by some memory write operation, (b) data of the first cache line has not been written to the shared memory, and (c) the first cache line is currently not accessed by any transaction, the first cache sets state of the first cache line to modified-with-atomic-read, without writing data of the first cache back to the shared memory; and wherein, when the execution of the first transaction is one of completed or aborted, if the first cache line is in a modified-with-atomic-read state, the first cache sets the first cache line to a modified state, the modified state indicating that (a) the first cache line has been modified by some memory write operation, and (b) data of the first cache line has not been written to the shared memory.

11. The system of claim 2, wherein, when the first cache detects a buffer overflow for the first transaction, the first cache aborts the first transaction.

12. The system of claim 2, further comprising:

a first backup buffer operatively associated with the first cache, wherein the first backup buffer maintains data of the first cache line, if (a) the first cache line is currently modified by the first transaction, and (b) the first cache line needs to be replaced from the first cache; and a second backup buffer operatively associated with the first cache, wherein the second backup buffer maintains address of the first cache line, if (a) the first cache line is currently read, but not modified, by the first transaction, and (b) the first cache line needs to be replaced from the first cache.

* * * * *